United States Patent [19]

Smith et al.

[11] 4,277,127
[45] Jul. 7, 1981

[54] DOPLER EXTENDED DEPTH OF FIELD IMAGING SYSTEM WITH COHERENT OBJECT ILLUMINATION

[75] Inventors: James L. Smith, Grand Prairie, Tex.; Charles R. Christensen, Athens, Ala.

[73] Assignee: The United States of America as represented by the Secretary of the Army, Washington, D.C.

[21] Appl. No.: 99,262

[22] Filed: Dec. 3, 1979

[51] Int. Cl.³ .............................................. G03H 1/14
[52] U.S. Cl. ........................................................ 350/3.67
[58] Field of Search ................. 350/3.6, 3.67, 3.68, 350/3.83, 3.84

[56] References Cited

U.S. PATENT DOCUMENTS

| | | | |
|---|---|---|---|
| 3,572,882 | 3/1971 | Neumann | 350/3.6 |
| 3,749,470 | 7/1973 | Brown et al. | 350/3.67 |
| 3,816,649 | 6/1974 | Butters et al. | 350/3.72 |
| 3,937,555 | 2/1976 | Kurtz | 350/3.6 |
| 3,954,322 | 5/1976 | Aleksoff et al. | 350/3.67 |

OTHER PUBLICATIONS

Mottier, F. M., "Holography of Randomly Moving Objects", Applied Physics Letters, vol. 15, Number 2, pp. 44-46, Jul. 1969.

Primary Examiner—John K. Corbin
Assistant Examiner—Bruce Y. Arnold
Attorney, Agent, or Firm—Nathan Edelberg; Robert P. Gibson; Harold W. Hilton

[57] ABSTRACT

A packageable system employs principles of Doppler holography on near-field objects to produce images from which photographs, transparencies or video reproductions can be made with simultaneous improvements in depth of field, foreground-backregion exposure ratio, and resolution (where degraded by the object medium). The apparatus consists of two units: a main unit containing a laser and optics, and an external platform that rotates at an appropriate angular velocity, through a very small arc, during image recording of an object on the platform.

2 Claims, 2 Drawing Figures

DOPLER EXTENDED DEPTH OF FIELD IMAGING SYSTEM WITH COHERENT OBJECT ILLUMINATION

BACKGROUND OF THE INVENTION

There are many instances in which it is desirable to obtain informative photographs of objects whose depth of field and distance from the objective lens are comparable and furthermore are not very large compared to the objective lens diameter. Such cases concern near-field imaging which may include both industrial photography and microscopy.

At least three reasons exist why it is often advantageous to first make a hologram of the object and then photograph hologram(s): (1) one can record the "frozen" image of a transient phenomenon in three dimensions and determine later which focal plane(s) and angle(s) should be duplicated photographically; (2) double pulse holography may be employed so that fringes appear on the hologram indicating displacement between pulses; (3) hologram interferometry can be used to form fringes induced by contour or refractive index gradients.

There are, however, two troublesome problems in making photographs from conventional holograms: (1) for near-field images, there is a depth of field problem; i.e., no plane exists in which all of the image structures are in clear focus. Aperturing the camera lens would help in photographing the hologram, but this increases graininess (speckle) in the image, both foreground and background. (2) For large objects, the illuminating laser beam generally must diverge for complete coverage when the hologram is being made. This causes excessive light intensity in the image foregound relative to the image backregion. This undesirable situation is transferred to the photograph.

It is possible to obtain video images directly from the sum of image and reference beam light (in the hologram plane) without ever developing a hologram. The fringes caused by interference between reference and image light, which are normally recorded and developed in the holographic plate, are sensed directly by the video camera. Provided the image is focused in the hologram plane and an appropriate bandpass filter is used in the video electronics, one can see a two-dimensional image on the video monitor screen. Therefore, whatever advantages (depth of field increase, etc.) an apparatus imparts to a hologram can be imparted to the video monitor screen in realtime.

The apparatus of the present invention applies to the two problems outlined above in photographing holograms and also exhibits superresolution benefits found in Doppler spread imaging. The advantages to either photography or video monitoring of using the disclosed system over conventional holographic arrangements are as follows: (1) Greater depth of field, (2) attenuation of excessive foreground intensity caused by diverging object illumination light, (3) resolution improvement in one dimension when the object is seen through a degrading medium.

Examination of three-dimensional objects in a light-scattering medium (e.g., a biological structure imbedded in translucent tissue or electronic circuits in slightly colloidal potting compound) can be improved with the disclosed system. The same Doppler holography which permits greater depth of field also permits improvements in image quality impaired by a light-scattering or distorting medium. (The present invention differs from some previous generalized Doppler spread superresolution systems mainly in that it is specifically arranged for near-field imaging rather than far-field imaging, i.e., a diverging illumination source instead of collimated source; also it is arranged for economy of components and equipped to virtually eliminate shadows normally found in holographic images due to the object illumination.) Since resolution improvement is in one dimension only, successive object rotations in a vertical plane along the system axis (perpendicular to the Doppler-inducing rotation) will result in images with a variety of directions in which resolution is improved. Superposition of transparencies made from photos of such images (or computer-controlled multiplication of video images) can bring out detail normally hidden. Thus, the disclosed system, by being designed to reduce the depth of field problem, also improves resolution.

SUMMARY OF THE INVENTION

Apparatus of the present invention includes a laser and associated optics for illuminating an object on a rotating/oscillating platform from which reflected light is collected and imaged on or near a hologram plane along with a Doppler-shifted reference beam: a beam splitter splits a laser beam into two parts. For one beam an expander provides a diverging beam which reflects through a mirror or beam/splitter onto the object. Reflected light passes from the object through an aperture in an object lens where it is focused and projected to a new focus on or near the halogram plane. Another part of the beam split off by the first beam splitter is directed to a mirror, through a beam expander and a collimator, to strike a rotating oscillating reference mirror. A pair of reference beam focus lenses conjugates the plane of the reference mirror onto or near the hologram plane. With proper adjustments of $\omega_o$ and $\Delta S$ (instantaneous reference mirror angular velocity and focus position of the object lens), Doppler-resolved holographic images appear at the holographic plane.

DESCRIPTION OF THE PREFERRED EMBODIMENT

Figure 1:
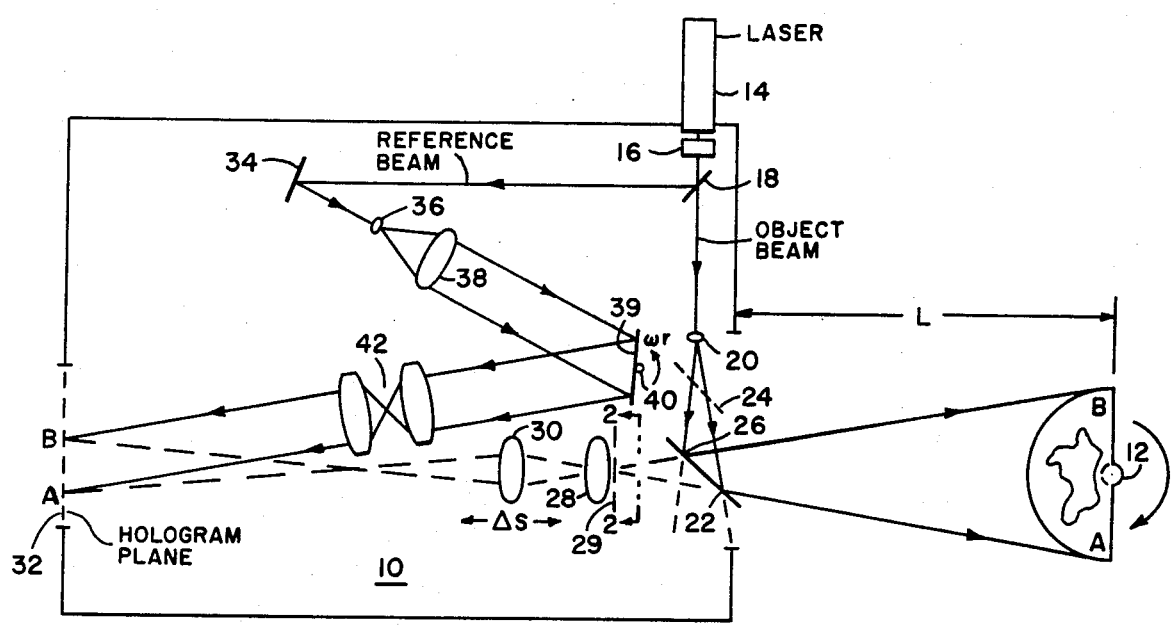
FIG. 1 schematically shows the optical system of the apparatus of the present invention.
Figure 2:
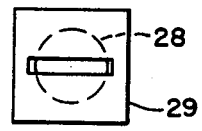
FIG. 2 is a view along line 2—2 of FIG. 1.

Apparatus of the present invention includes a main unit 10 and an external platform 12. Unit 10 includes a laser 14, shutter 16, beamsplitter 18, beam expander 20, beam splitter 22 (at positions 24 or 26 for object illumination), slit apertured objective lens 28, focus lens 30, hologram plane 32, mirror 34, beam expander 36, collimation lens 38, mirror mounted on a rotating/oscillating platform 40, and reference beam focus lens pair 42, all enclosed in a protective housing.

Platforms 12 and 40 are mounted on either an oscillating galvanometer powered by a scanner driven amplifier or a motor capable of complete revolutions. (The essential requirement is that, during image recording, the platform rotates at appropriate angular velocity $\omega_o$ through a very small arc).

Laser light from laser 14 is directed through a shutter 16 and a beam splitter 18 and then through a beam expander 20 and splitter 22. When the illumination beam splitter 22 is in position 26, the diverging beam reflects out onto the object on the rotating/oscillating platform 12. The virtual source of the illumination light is then the slit-apertured objective lens 28. This arrangement insures that shadows of structures on the object are almost entirely covered by the structures. However, the requirement of having a beam splitter at 26 reduces the amount of light the lens 28 can collect. Therefore, an option is to place a mirror at 24. When at this position, the lens 28 can collect more light. Thus, the position 24 is more desirable whenever shadows on the object do not present a problem and maximum illumination is desired.

The lens 28 has a slit aperture 29 over it, the horizontal dimension (slit length) being greater than the vertical dimension (slit width). This type aperture stops the system to increase depth of field with respect to vertical focus. The wide horizontal opening allows more light to enter the lens than if the aperture were equally small in both width and length; this additional light is a desirable feature. (The poor depth of field with respect to horizontal focus which would normally result with such an aperture is taken care of by the Doppler principles employed which do not reduce equally the light intensity forming both foreground and background image structures.) Light passing through 28 is focused and then projected by the focus lens 30 to a new focus on or near plane 32. The focus position latitude of projection lens 30 is indicated as ΔS.

A small part of the laser beam is split off at 18 and is directed to the mirror 34 where it is then reflected through a beam expander 36 and collimator 38. After passing through 38 the beam strikes the rotating/oscillating reference mirror 39 which is responsible for the Doppler encoding of the reference beam. The reference beam focus lens pair 42 conjugates the plane of the reference mirror onto or near plane 32.

The backregion is a part of the object and is the plane running through the axis of 12. It is essential that the reference mirror image axis coincide with the image of the object axis and that the motion-induced Doppler encoding (frequency change across the reference mirror image and the object backregion image) on or near plane 32 be identical. For given object distance L and instantaneous angular velocity $\omega_o$, the reference mirror instantaneous angular velocity and focus lens position ΔS are adjusted to give coincidences of focal planes and Doppler encodings.

Because of the identical Doppler encoding on images of reference mirror and object backregion, interference fringes form (practically motionless over a time t for which $\omega_o t$ is very small) and allow complete reconstruction of the backregion image. The light from points in the object foreground (nearest the lens 28) do not, however, focus to a point in the same plane. This would normally constitute a blur (in the plane of the backregion image), but the light from a given foreground point coincides in frequency with the Doppler encoded light from the reference mirror only in a region much smaller than the blur dimension. Thus, the interference fringes which are necessary for reconstruction of the images will cover a correspondingly small area. The result is a decrease of blur, or a depth of field increase. The incomplete coincidence of Doppler encoding effectively results in stopping of the foreground. Due to complete coincidence for the backregion image, it is effectively unstopped.

The reconstructed image may be observed either by recording interference fringes in a photographic plate (a hologram) and viewing it in coherent light, or by placing the vidicon of a TV camera at plane 32 and viewing (in realtime fashion) the image on a video monitor which is preceded by suitable band-pass electronics. In the latter case the cycle periods of the laser shutter 16 and object platforms 40 and 12 must be synchronized.

A few more comments of a practical nature are in order: For large scale work, a laser with several meters coherence length is desirable. Where one does not opt for such a laser, the position of mirror 34 and the angle of mirror 18 are made adjustable so that the laser path (18)-(26)-(12)-(26)-(32) can be made to within a coherence length of (18)-(34)-(40)-(32), provided L is suitably chosen. The reference beam is likely to be too strong unless the mirror 34 is only slightly reflecting. If a 100% mirror is used, however, one can compensate by using attenuators anywhere between 18 and 34 or 34 and 36, or by simply using a variable beam splitter at 18. Whereas far-field (or simulated far-field) Doppler spread holography produces no perspective in the reconstruction, such will occur in the apparatus of the present invention. This is not to be regarded as a shortcoming unless isometric projection is desired. Finally, the same Doppler encoding which improves depth of field (reduces blur) will also assist in resolving an image observed through a distorting medium (translucent tissue or milky potting compound, etc.) in the horizontal dimension.

We claim:

1. A holographic Doppler extended depth of field imaging system having coherent object illumination comprising:
   a. a laser disposed for generating a coherent light beam, said laser having shutter means for directing said light beam;
   b. a rotating reflecting object to be recorded;
   c. a first beam splitter means for splitting said light beam into reference and object beams;
   d. a first beam expander for expanding said object beam;
   e. a second beam splitter disposed between said rotating reflecting object and said first beam expander for directing said object beam to said rotating reflecting object;
   f. a slit aperture lens for receiving the reflected object beam from said rotating reflecting object;
   g. a focus lens disposed for receiving said reflected object beam;
   h. a hologram plane for receiving said focused object beam;
   i. a mirror for reflecting said reference beam;
   j. a second beam expander for expanding said reflected reference beam;
   k. a collimator for collimating said reference beam;
   l. a rotating/oscillating mirror for receiving said collimated reference beam for Doppler encoding thereof; and,
   m. a focus lens pair for receiving said collimated reference beam and for directing said reference beam to said hologram plane.

2. A holographic Doppler extended depth of field imaging system as in claim 1 wherein said rotating reflecting object and said rotating/oscillating mirror are mounted on an oscillating galvanometer powered by a scanner driven amplifier.

* * * * *